Oct. 13, 1931.  R. L. HARRISON  1,826,931
EARTH WORKING APPARATUS
Filed Oct. 18, 1930   2 Sheets-Sheet 1
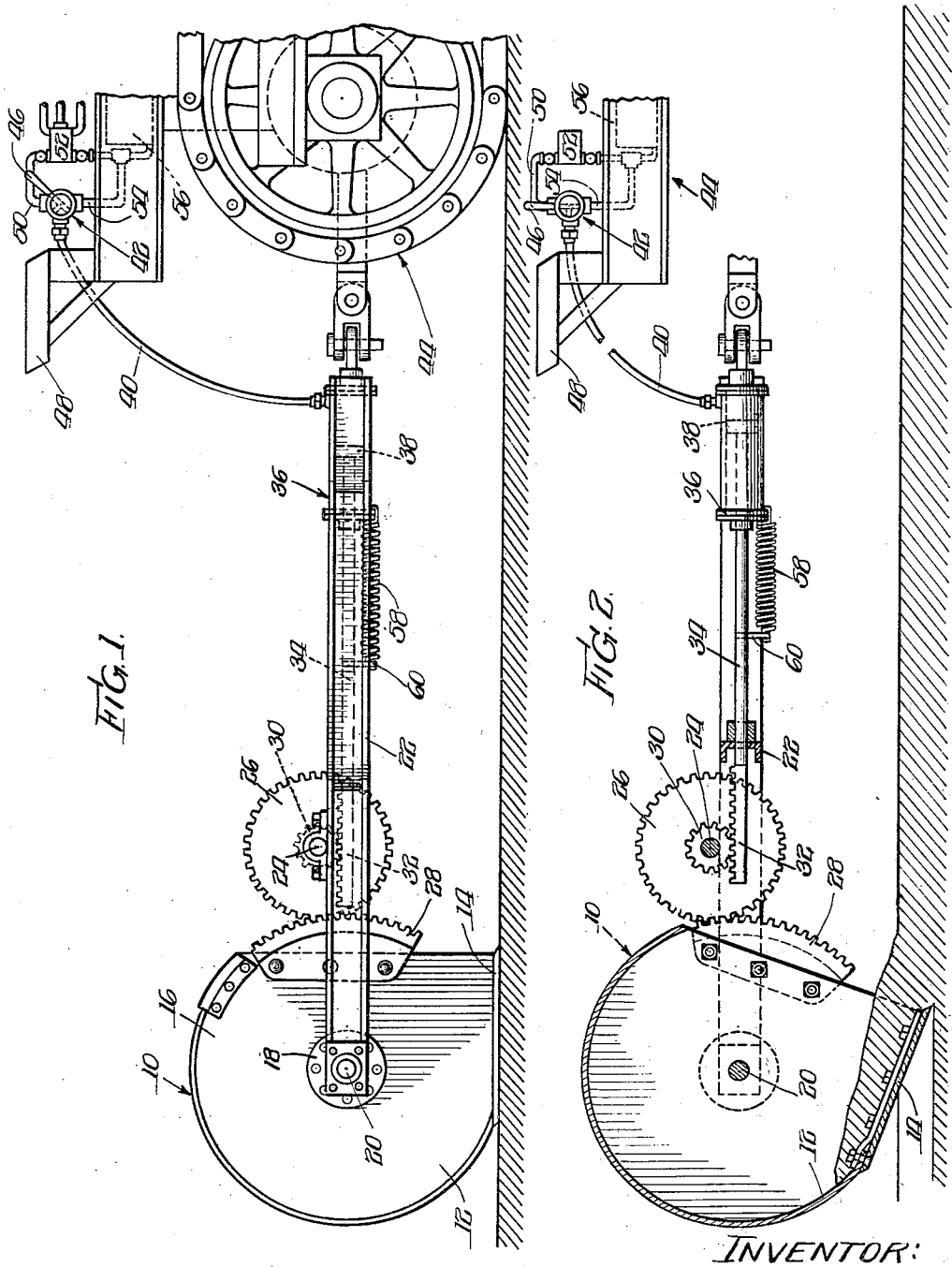
INVENTOR:
RAYMOND L. HARRISON
BY *Cheever, Cox & Moore* ATTYS.

INVENTOR:
RAYMOND L. HARRISON

Patented Oct. 13, 1931

1,826,931

UNITED STATES PATENT OFFICE

RAYMOND L. HARRISON, OF ALBUQUERQUE, NEW MEXICO

EARTH WORKING APPARATUS

Application filed October 18, 1930. Serial No. 489,519.

My invention relates generally to earth working apparatus and particularly to scrapers and the like of the "fresno" type, which are adapted to be drawn across the surface of the soil.

It is one of the objects of my invention to provide an improved, practical means for controlling the position of the cutting edge of a tiltable earth receiving bowl, and to this end I propose to provide a very simple and conveniently operable hydraulic mechanism for controlling the tilting of said bowl.

More specifically, it is an object of my invention to provide a rotary mechanism for shifting a tiltable earth receiving bowl, which mechanism may be controlled by an operator conveniently positioned on a mechanism, such as a tractor, used for drawing the bowl across the surface of the soil.

Still more specifically, it is an object of my invention to provide, in combination with a rotary driving means for a bowl or "fresno", as above set forth, a hydraulic control device, including a piston shiftable within a cylinder, which hydraulic mechanism is adapted to actuate said rotary driving means.

A further object of my invention is to provide a tiltable "fresno" or bowl with a gear segment and complementary driving gears actuated by a hydraulic mechanism, the actuation of said segment and gears being controlled by an operator remotely positioned with respect thereto.

The foregoing and numerous other objects and advantages will be more apparent from the following detailed description when considered in connection with the accompanying drawings, wherein—

Figure 1 is a side elevational view of an earth working apparatus which is representative of one embodiment of my invention;

Figure 2 is a fragmentary view of the device shown in Figure 1, with the earth receiving bowl tilted to a cutting position;

Figure 3:
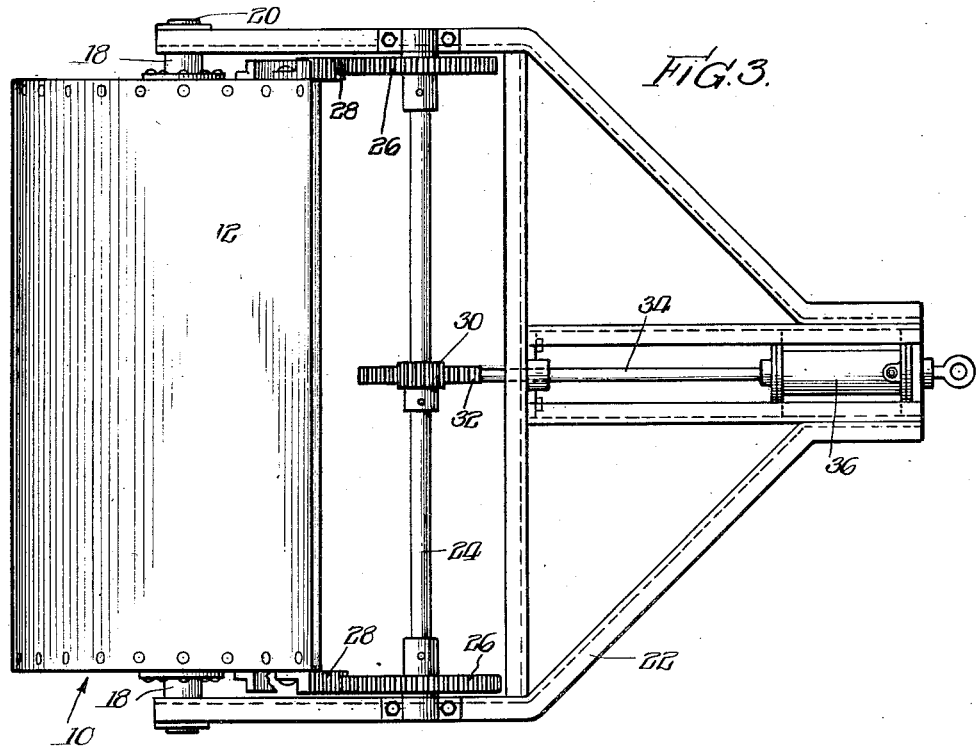
Figure 3 is a plan view of the mechanism shown in Figure 1.

Referring now to the drawings more in detail wherein like numerals have been employed to designate similar parts throughout the various figures, it will be observed that my invention contemplates the provision of an earth receiving bowl or "fresno", which I have designated generally by the numeral 10. This bowl 10 includes a substantially semi-cylindrical section 12, which is connected along one margin to an earth receiving plate 14. Said bowl also includes a pair of side plates 16, and these side plates are connected with central bearings 18, which are rotatable upon a shaft 20, which is mounted at each extremity within a draft frame 22.

This draft frame also supports a shaft 24, which extends in substantial parallelism with the shaft 20. This shaft 24 carries at each extremity a gear 26, and these gears 26 are adapted to mesh with companion segments or quadrants 28 secured to the side plates 16 of the bowl 10. Thus, if rotation is imparted to the shaft 24, rotation will be contemporaneously experienced by the bowl 10.

Means for imparting rotation to the shaft 24 includes a pinion 30 positioned medially thereof and a rack bar 32 positioned below and meshing with said pinion. This rack bar 32 may be formed integral with or independent of a piston rod 34, which extends into a cylinder 36 and connects with a piston 38 within said cylinder. This cylinder 36 is supported in any convenient manner upon the draft frame 32, and one extremity of said cylinder is connected by means of a suitable flexible conduit 40 with a control valve 42.

Figure 4:
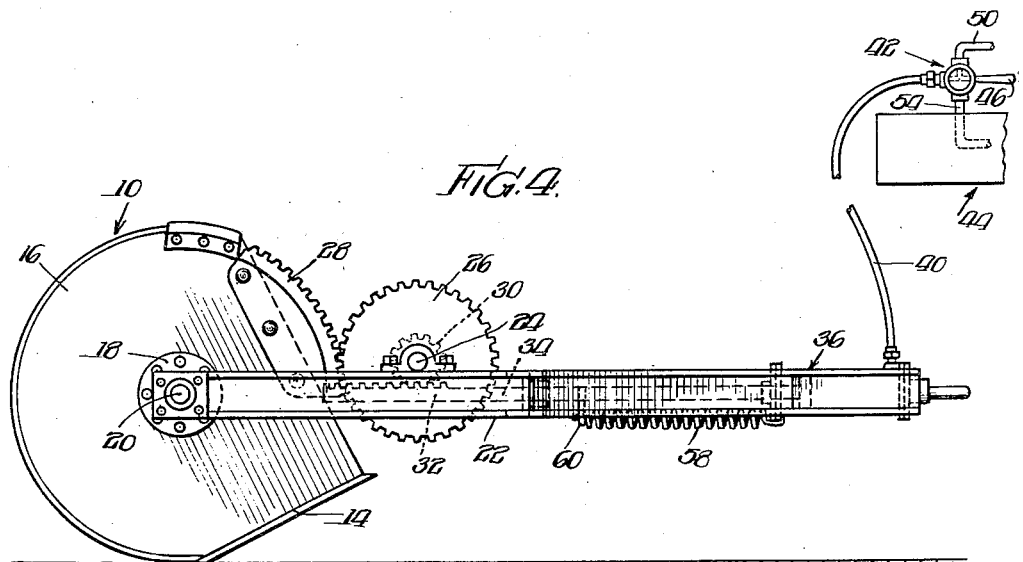
Figure 4 is a view similar to Figures 1 and 2, disclosing the bowl tilted to a rearward or carrying position.

This control valve 42 may be of the conventional three-way type and is preferably mounted upon the draft mechanism or tractor 44, which is employed to draw the draft frame and its associated parts along the surface of the soil. Obviously, any suitable draft or drawing mechanism may be employed, and for purposes of illustration I have disclosed the particular tractor device 44. The valve 42 may be actuated by moving a suitable control lever 46, which is conveniently operable by an attendant occupying the seat 48. One side of the valve is connected through the agency of a suitable pipe 50 to the egress side of a pump mechanism 52, and the other side of the valve is connected by means of a pipe 54 to the ingress side of the pump mechanism 52. Thus, when the valve handle 46 occupies the position shown in Figure 1, oil is locked within the cylinder 36 and the conduit 40, thereby securing the bowl 10 against rotation, provided the teeth of the gear 26 and the segment 28 are in mesh. By moving the lever or handle 46 in a clockwise direction to the position shown in Figure 4, until it assumes a substantially horizontal position, oil will enter the conduit 40, thereby applying pressure to the piston 38 within the cylinder 36 so as to effect the rearward movement of the piston rod 34 and consequently the rearward shifting of the rack bar 32 (to the left, Figures 1 and 2). If the handle 46 is moved to a vertical position, in a counterclockwise direction from the position shown in Figure 1, pressure within the cylinder 36 will be relieved, that is to say, fluid from the pump mechanism 52 will pass through the valve 42 and will be returned through the pipe 54 to a reservoir 56. In other words, fluid from the right side of the piston 38 within the cylinder 36 will be free to flow upwardly through the conduit 40 and thence through the return pipe 54. In order to constantly urge the piston 38 to the right, I employ a coiled spring 58, which is interposed between a pin 60 carried by the rod 34 and a flange portion of the cylinder 36, as clearly shown in Figures 1 and 2. This spring is strong enough to automatically effect the tilting of the bowl 10 when the control handle 46 is moved to the vertical position, as described above.

In using my improved earth working apparatus, the operator positioned upon the seat 48 may control the position of the cutting edge of the plate 14 by merely manipulating the control handle 46. In this connection it should be understood that the pump mechanism 52 may be driven in any convenient manner by the engine (not shown) of the tractor 44. Assume that the bowl or "fresno" 10 occupies the position shown in Figure 1 and it is desirable to make a surface cut in the soil. The operator causes the tractor to be urged forwardly so as to draw the bowl 10 across the ground and then moves the handle 46 to its vertical position shown in Figure 2. In this position the oil from within the cylinder 36 is free to flow upwardly through the conduit 40 and through the return pipe 54, and the rolling of the bowl on the surface of the soil causes said bowl to be rotated in a clockwise direction as viewed in Figure 2. When the bowl has been rotated to the proper cutting position, as, for example, the cutting position shown in Figure 2, the operator returns the handle 46 to the position shown in Figure 1, in which position the valve 42 locks the actuator piston 38 against further movement to the right. Thus, the bowl 10 is secured against further clockwise rotation. When a suitable load of soil has been received by the bowl, and the operator desires to shift this load to another location, it is only necessary to move the control handle to the horizontal position shown in Figure 4, thereby causing fluid under pressure to be directed into the cylinder 36 against the piston 38. This causes the shaft 24 to be rotated in a clockwise direction, as viewed in Figure 4, thereby causing the driving gears 26, which mesh with the quadrants 28, to impart a counterclockwise rotation to the bowl 10. When the bowl is moved to the position shown in Figure 4, the operator shifts the control lever to the locking position shown in Figure 1, thereby retaining the bowl in this carrying position. The soil within the bowl may now be transported to any other location, and when it is desired to dump the load, the operator moves the handle 46 to the vertical position shown in Figure 2, and the natural tendency of the bowl to revolve when urged across the surface of the soil will cause same to rotate in a clockwise direction until the dumping position is reached. When this dumping position has been reached, the segment or quadrant 28 will have moved past the companion driving gears 26, and in order to bring the teeth of these elements into mesh again, it is only necessary to impart continued rotation to the bowl.

From the foregoing it will be apparent that my invention provides a very convenient and effective means for controlling the position of the cutting edge of a "fresno" or bowl with respect to the surface of the soil. The driving elements are simple in construction and constitute shafts and gears, which may be readily assembled or disassembled for purposes of repairs and replacements. The hydraulic actuating mechanism is also of extremely simple design, and the control of the actuation thereof is conveniently effected by an operator.

Obviously, my invention is not limited to the specific structure shown in the drawings, but is capable of numerous other modifications and changes without departing from the spirit and scope thereof. Therefore my invention should be limited only by the scope of the appended claims.

Having thus described my invention, what I claim as new and desire to secure by Letters Patent is:

1. In an earth working apparatus adapted to be moved across the surface of the ground, the combination with an earth carrying bowl having a material receiving edge, of rotary driving means for imparting movement to said bowl, and hydraulically operable means for actuating said rotary driving means, whereby to vary the position of said material receiving edge with respect to the surface of the ground.

2. In an earth working apparatus adapted to be moved across the surface of the ground, the combination with an earth carrying bowl having a material receiving edge, of rotary driving means for imparting movement to said bowl, hydraulically operable means for actuating said rotary driving means, whereby to vary the position of said material receiving edge with respect to the surface of the ground, and means for pivotally supporting said bowl at the opposite sides thereof.

3. In an earth working apparatus adapted to be moved across the surface of the ground, the combination with an earth carrying bowl having a material receiving edge, of rotary driving means including meshing gear members for imparting movement to said bowl, and hydraulically operable means for actuating said rotary driving means, whereby to vary the position of said material receiving edge with respect to the surface of the ground.

4. In an earth working apparatus of the class described adapted to be drawn across the surface of the ground, an earth carrying means having a material receiving edge, a frame pivotally supporting said earth carrying means, means for tilting said earth carrying means about its pivotal support including a rotary driving mechanism, and hydraulic actuating means for imparting movement to said rotary driving mechanism.

5. In an earth working apparatus of the class described adapted to be drawn across the surface of the ground, an earth receiving bowl having a material receiving edge, a frame pivotally supporting said bowl, a gear section connected with said bowl, a driving gear adapted to mesh with said gear section, and hydraulic actuating means for imparting rotation to said driving gear, whereby to vary the position of the material receiving edge of said bowl with respect to the surface of the ground.

6. In an earth working apparatus of the class described, adapted to be drawn across the surface of the ground, an earth carrying bowl having a material receiving edge, a frame tiltably supporting said bowl, a drive shaft spaced from and positioned in substantial parallelism with the axis of the bowl, gear mechanism driven by said shaft for tilting said bowl, and hydraulic mechanism operatively connected with said shaft for imparting rotation thereto.

7. In an earth working apparatus of the class described adapted to be drawn across the surface of the ground, an earth carrying bowl having a material receiving edge, a frame for tiltably supporting said bowl, gear mechanism for tilting said bowl, a rack and pinion device for actuating said gear mechanism, and hydraulic mechanism for effecting the actuation of said rack and pinion, whereby to control the position of the material receiving edge of said bowl with respect to the surface of the ground.

8. In an earth working apparatus of the class described adapted to be drawn across the surface of the ground, an earth receiving bowl having a material receiving edge, a frame pivotally supporting said bowl, a gear mechanism for imparting rotation to said bowl for varying the position of the earth receiving edge thereof with respect to the surface of the ground, hydraulic mechanism for controlling the actuation of said gear mechanism, and valve means remotely positioned with respect to said bowl for controlling the actuation of said hydraulic mechanism.

9. In an earth working apparatus of the class described adapted to be drawn across the surface of the ground, an earth receiving bowl having a material receiving edge, a frame pivotally supporting said bowl, a gear mechanism for imparting rotation to said bowl for varying the position of the earth receiving edge thereof with respect to the surface of the ground, hydraulic mechanism for controlling the actuation of said gear mechanism, and a three-position valve remotely positioned with respect to said bowl for controlling the actuation of said hydraulic mechanism.

In witness whereof, I have hereunto subscribed my name.

RAYMOND L. HARRISON.